Patented Oct. 12, 1926.

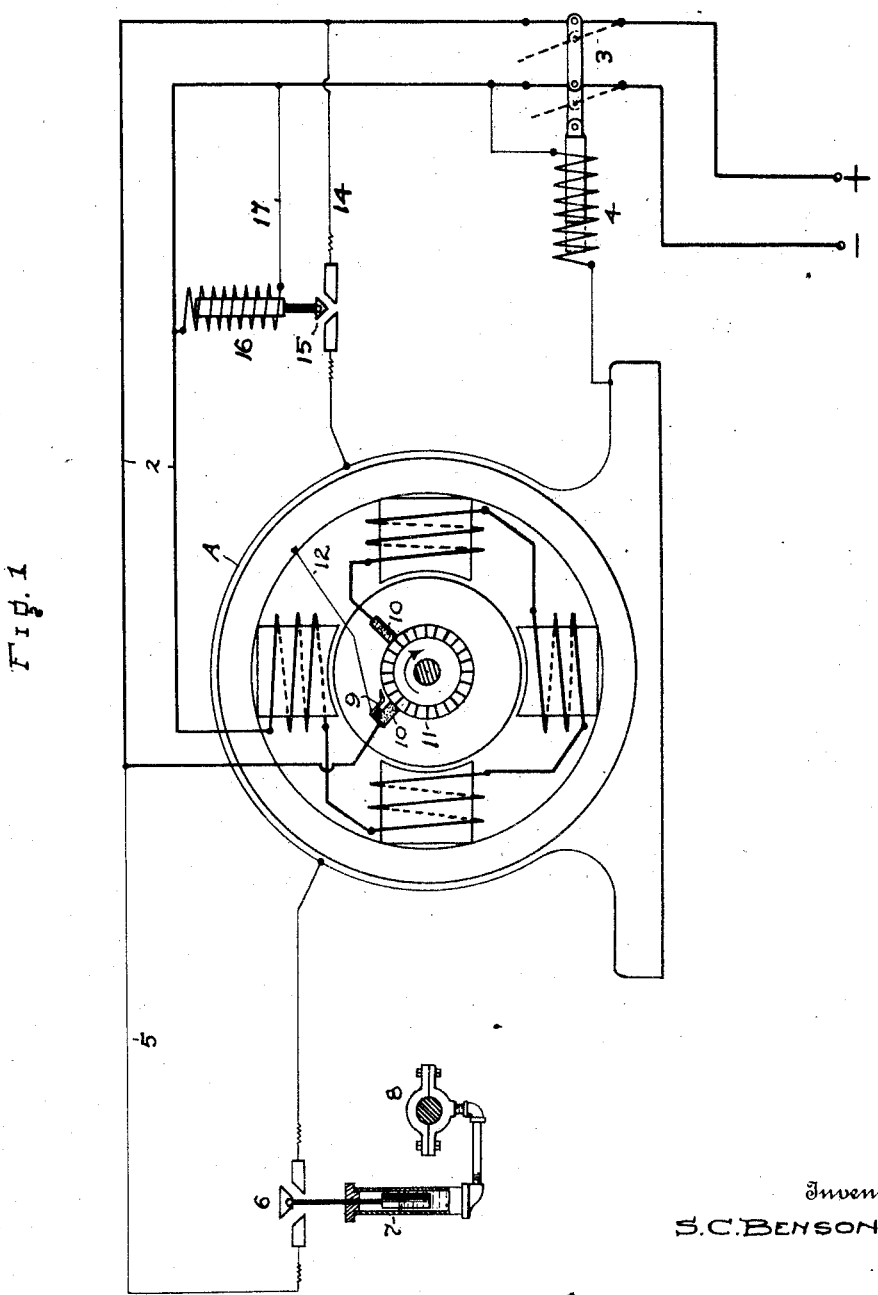

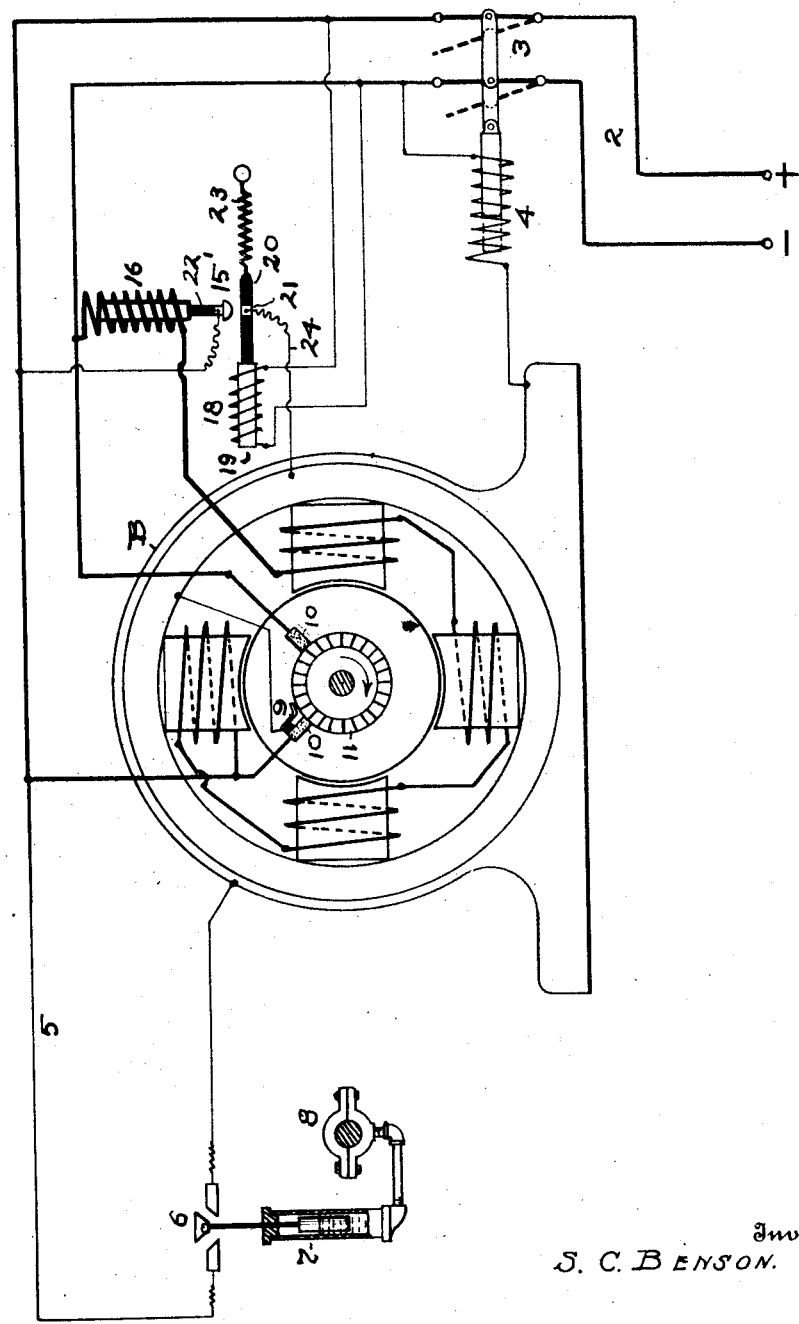

1,602,743

UNITED STATES PATENT OFFICE.

SAMUEL C. BENSON, OF HARRISVILLE, OHIO, ASSIGNOR OF ONE-FOURTH TO J. J. ROBY, OF CLEVELAND, OHIO; ONE-FOURTH TO R. W. MOORE, AND ONE-FOURTH TO L. S. MOSCRIP, BOTH OF ADENA, OHIO.

ELECTRIC-MOTOR PROTECTION.

Application filed October 25, 1921. Serial No. 510,322.

This invention relates to an improvement in electric motors, the improvement consisting in the use of the safety circuits and devices for the motor substantially as herein shown and described and more particularly pointed out in the claims, whereby the source of electric supply for the motor may be cut off automatically, and the motor stopped, first, in the event of lack of oil in the motor journals or bearings, second, when an armature coil opens and causes sparking at the brushes, third, upon the fields becoming grounded, and fourth, if an open field circuit occurs.

In the accompanying drawing, Fig. 1 is a diagrammatic view of a series wound motor embodying my improved safety circuits and devices, and Fig. 2 is a similar diagrammatic view of the safety circuits and devices in connection with a shunt-wound motor.

The invention as exemplified in Fig. 1 consists of a series wound motor A having a main circuit 2 in which a magnetic switch 3 is connected to control the electric current supply. As shown, this magnetic switch comprises a coil 4 connected with the negative wire of circuit 2 and with the metal frame of motor A and whenever this coil is energized switch 3 is opened and the current cut off from motor A. However to energize coil 3 it is necessary that a shunt circuit be established through the frame of the motor, and which result is effected temporarily only when magnetic switch 3 is closed. Thus, at the left of Fig. 1, I show a shunt circuit 5 having a float controlled switch 6 which is held open as long as an adequate supply of oil remains in the column or cup 7 attached to the journal or bearing 8 of the motor. When the oil falls below a predetermined level the drop switch 6 closes and a part of the current from the main circuit is shunted through circuit 5 to the frame of the motor and thence through coil 4, in this way operating switch 3 to stop the motor and prevent injury to the bearings through lack of oil. Manifestly, such a safety circuit and device is of value and utility where a motor is infrequently attended or used in remote or inaccessible places as in driving pumps in mines, etc.

Opening of magnetic switch 3 and cutting off the current to the motor is also brought about whenever main circuit 2 is grounded through the frame of the motor and is caused to pass through coil 4 in its return to the line.

Magnetic switch 3 is also actuated whenever a loop or coil in the armature of the motor opens. Thus, a separate spark intercepting element 9 is mounted in an insulated position at one side of one brush 10 or each brush of the motor at a point closely adjacent but apart from the commutator 11, and this element is electrically connected by a wire 12 with the frame of the motor. If an open coil in the armature develops a spark will be produced intermittently at brush 10 as the armature revolves, thus shunting the current by the spark itself to element 9 and to the frame from whence it passes through coil 4 to the line until switch 3 is pulled open and the current cut off from motor A.

The current is also cut off from the motor by switch 3 in the event of an open field. Thus, a shunt 14 from the main circuit 2 to the frame of the motor has an automatic switch 15 therein which is held open by a solenoid 16 as long as the solenoid receives current from main circuit 2 over its own shunt circuit 17. A break in the field de-energizes solenoid 16 and permits switch 15 to close by gravity thereby shunting the current from the line through the frame of the motor and thence through coil 4 of magnetic switch 3 which is then opened and the current entirely cut off from the motor to avoid further damage to the fields.

In Fig. 2, I show substantially the same safety devices and circuits as in Fig. 1, but the motor B is shunt-wound, and the coil of solenoid 16 is connected in series with the fields. In addition I show a modified form of automatic switch 15', comprising a horizontally disposed solenoid 18 in shunt with main circuit 2 or in series with solenoid 16 in circuit 2, and constantly energized as long as there is current flowing over the line. The movable core 19 of the solenoid 18 has an insulated stem 20 provided with a metal contact 21 adapted to be engaged by a contact element on the gravity member 22 of solenoid 16 when it drops due to a break in the fields. A coiled spring 23 serves to pull core 19 and stems 20 outward when solenoid 18 is de-energized but otherwise said spring is ineffective. Assuming the motor is in operation and the parts set as shown, if a field breaks or opens the vertical solenoid 16 is de-energized and the gravity member 22 drops upon metal contact 21 and closes shunt circuit 24 connected with the frame of the motor thus energizing coil 4 and opening switch 3. But it is a common practice, especially in motors in mines, to use a circuit breaker in the line at a remote distance from the motor. In that case if the circuit breaker is operated and cuts off the current on the line leading to the motor while the parts are in the position shown in Fig. 2, both solenoids 16 and 18, respectively, will be deenergized while magnetic switch 3 remains closed. Core 19 and its stem 20 will then be pulled outward by spring 23 and the gravity member 22 will then rest upon the insulated stem and not upon contact 21. Consequently, when the circuit breaker is again closed and current again supplied to the motor over the line no shunt will be established over circuit 24 to open magnetic switch 3 at this time. Instead, the current flowing over main circuit 2 will energize solenoid 16 and lift gravity member 22 prior to the spring-retarded movement of the core of horizontal solenoid 18. Then when the parts are related as shown in Fig. 2, the safety devices will function to operate the magnetic switch in the event of lack of oil, a ground through the frame, an open loop in the armature, or a break in the fields.

What I claim is:

1. An electric motor having a main circuit provided with a magnetic switch, and a second magnetic switch in shunt with the main circuit adapted to energize said first magnetic switch upon the occurrence of an open field in said motor.

2. An electric motor having a main circuit provided with a magnetic switch having a coil electrically connected thereto and to the metal frame of said motor, normally de-energized and adapted to cut off the supply of electric current upon the occurrence of a ground through the motor frame.

3. An electric motor having a main circuit provided with a magnetic switch, adapted to cut off the current to the motor, a second magnetic switch adapted to shunt a part of the current through said first magnetic switch upon the occurrence of a break in the motor circuit on one side of said switch and a self-acting device associated with said means adapted to render the latter inactive when the main supply of current is cut off.

4. An electric motor having a main circuit, a magnetic switch normally de-energized and adapted to open said circuit, comprising a shunt circuit for energizing said magnetic switch, and a pair of co-operating solenoids connected with the main circuit adapted to control said shunt circuit co-operatively, one of said solenoids having a controlling spring to retard its switching operations.

SAML. C. BENSON.